Patented Nov. 3, 1931

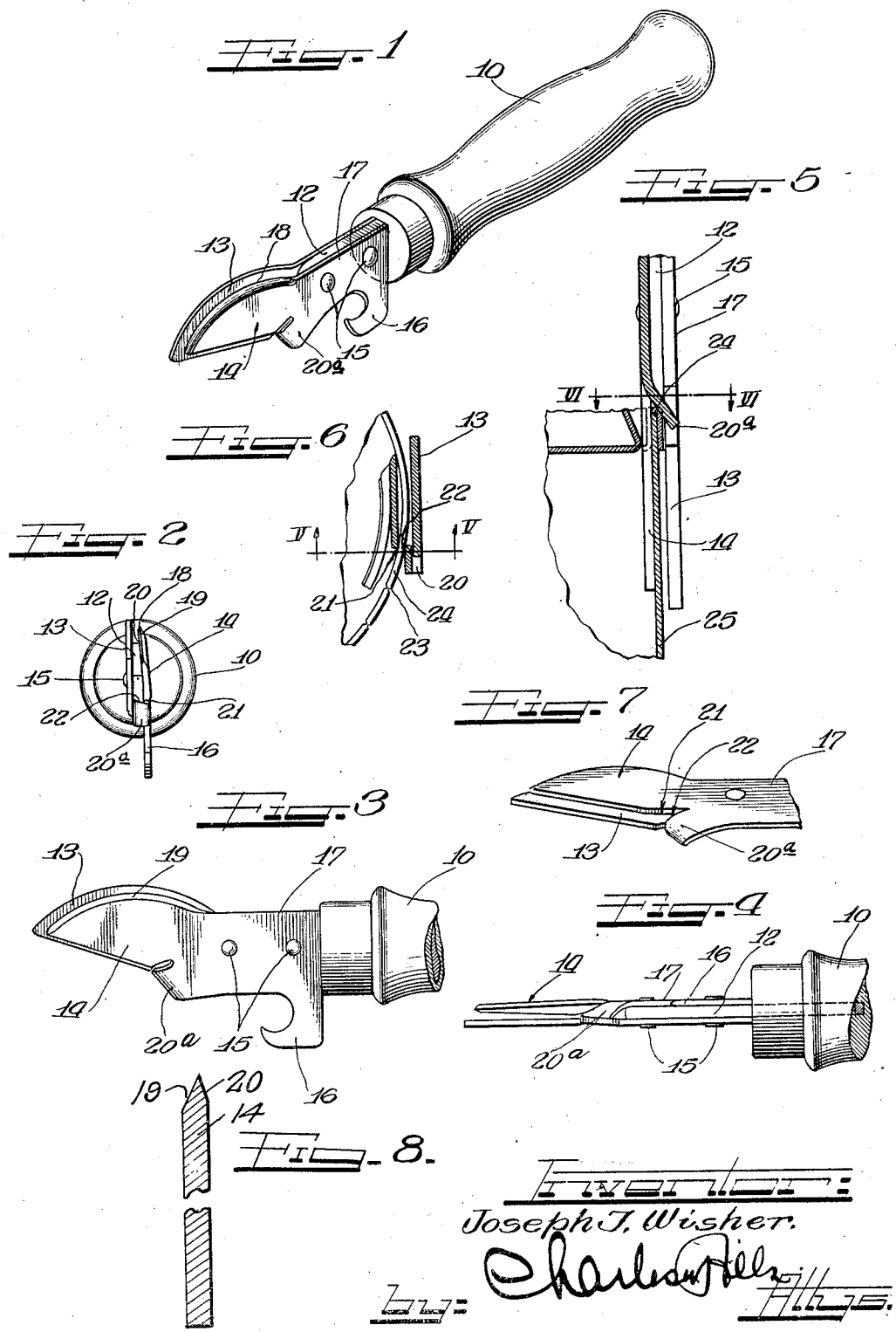

1,830,497

UNITED STATES PATENT OFFICE

JOSEPH T. WISHER, OF CHICAGO, ILLINOIS

CAN OPENER

Application filed November 2, 1929. Serial No. 404,263.

This invention relates to can openers, and more particularly to an improved can opener comprising a lever of the first class.

It is an object of this invention to provide a simple, durable, efficient and easily manufactured can opener, which will positively grip the bead of a can and not slip, which is easily operated, which is provided with a blade that will not catch on the seam of the can or other projections inside the can such as solder, which is equally efficacious in removing the top of either a square or round can, and one in which the cutting edge of the blade is so protected that an operator cannot become injured thereby.

Other and further important objects of this invention will be apparent from the disclosures in the accompanying drawings and the following specification.

The invention (in a preferred form) is illustrated on the drawings and hereinafter more fully described.

On the drawings:

Figure 1 is a perspective view of a can opener embodying this invention.

Figure 2 is an end elevational view of the device shown in Figure 1.

Figure 3 is a side elevational view of the device shown in Figure 1.

Figure 4 is a plan view of the device shown in Figure 1.

Figure 5 is an enlarged fragmental sectional view showing the device in a vertical position with the cutting blade pushed through a can-head, taken substantially on line V—V of Figure 6.

Figure 6 is a fragmental horizontal sectional view when the device is in a vertical position and thrust through a can-head, taken substantially on line VI—VI of Figure 5.

Figure 7 is a fragmental perspective view showing the cutting blade and guiding blade of the device.

Figure 8 is an enlarged sectional view of the cutting blade showing the details of the bevels forming the cutting edge.

As shown on the drawings:

In the illustrated embodiment of this invention, there is shown in Figure 1 a handle 10 having a shank 12 mounted in one end thereof. This shank forms a spacer member which extends between a guiding blade 13 and a cutting blade 14. These blades are secured to the shank by means of rivets 15 which securely hold them in definite spaced relationship.

The guiding blade 13 serves to protect the sharpened edge of the cutting blade from accidental injury and also prevents an operator from becoming injured by contact therewith. This is accomplished by providing a guiding blade which follows the general contour of the cutting blade and extends laterally past the edges of the cutting blade. A depending hook member 16 is integrally formed on the lower portion of a shank 17 of the cutting blade to provide a means for removing caps from bottles. The blade proper is angularly displaced with a reference to its shank 17 in order that the sharpened edge 18 of the blade will be somewhat closer to the guiding blade than the bottom edge thereof. The sharpened edge is arcuate in form. This shape has been found to be the most desirable for progressive cutting since the blade will be advanced at a substantially uniform rate, when the handle is moved downwardly. With a straight blade there would be a tendency to cut too much at one time. The sharpened edge of the blade is provided with a double bevel, that is, a bevel 19 on the outer side and a substantially shorter bevel 20 on the inner side. The inner bevel prevents the blade from catching on seams, solder, and the like which might be on the inner surface of the can. A furcation 20ª, integrally formed on the lower margin of the cutting blade, is bent so as to form an angle with the blade and extend across the space between the cutting blade and the guiding blade to form a notch for receiving the top edge of the can. Edges 21 and 22 of this notch will bear against the top edge of the can with a scissor like action as evidenced by the marks 23 of Figure 6. A fulcrum is thereby formed, and since only the edges 21 and 22 engage the top of the can, the can opener will be very easily operated. Due to this scissor like action, the can is gripped in such a manner that there is no possibility of the can opener slipping and injuring the operator.

In the operation of the device, the operator grasps the handle thereof and pushes the point of the cutting blade through the can head at a point near the inner side of the bead 24, as shown in Figure 5. The guiding blade engages with the outer side of this bead and extends downwardly along the side 25 of the can. The bead passes into the notch formed by the furcated portion and engages the edges 21 and 22. As additional force is applied, these edges will cut into the sides of the bead with a scissor-like action. The operator then rotates the device about these edges as a fulcrum by moving the handle rearwardly and downwardly. This motion moves the cutting blade upwardly, thereby forcing the sharpened edge to advance and cut the can head flush with the inner side of the can. As soon as a full cut is taken, the operator raises the handle to a substantially vertical position, moves the cutting blade forwardly in the cut just taken and by downward pressure again grips the bead and continues with a new cut as previously described.

This invention therefore provides an improved can opener which positively grips the bead of the can and will not slip. Also, a can opener which is easily operated and will not catch on the seam or other projection inside the can. The cutting blade is protected so that there is no danger of an operator becoming injured thereby. A can opener is provided which may be used with equal efficiency and effect on either a square or round type can.

I am aware that many changes may be made and numerous details of construction may be varied through a wide range without departing from the spirit of this invention, and I therefore do not purpose limiting the patent granted hereon otherwise than is necessitated by the prior art.

I claim as my invention:

1. In a can opener including a cutting blade and a guiding blade in spaced relationship, a furcation on one of said blades extending diagonally to the plane thereof and across the space between said blades to form a notch for positively gripping the bead of a can and form a fulcrum.

2. In a can opener, a handle, a blade guide, a blade having an upwardly presented arcuate cutting edge, means for securing said blade and guide to said handle in spaced relationship, and a furcation formed on said blade extending diagonally between said blade and guide, said blade and furcation being disposed relative to each other so as to cooperate to engage the can bead with scissor-like action and form a fulcrum.

3. A can opener comprising a flat metallic shank having a handle associated therewith, a substantially flat cutting blade secured to one side of said shank having an arcuate cutting edge, said edge being formed by bevels of different lengths, a substantially flat blade guide secured to the other side of said shank so as to lie in a substantially parallel plane to said cutting blade, said guide blade extending beyond the periphery of the cutting blade for protecting the same, a portion of said cutting blade being deflected to form a notch positioned in the space between said blades, said notch having edges adapted to positively grip the sides of a can bead and form a fulcrum.

4. A can opener comprising a handle, a cutting blade having a convex cutting edge, said cutting edge having a long outer bevel for forcing the cutting edge to maintain continuous engagement with a can bead during the cutting operation, and an inner bevel of shorter length than the outer bevel for deflecting the cutting edge of said blade away from projections on the inner surface of the can, a guide blade disposed in substantially parallel and spaced relationship to said cutting blade, said guide blade extending beyond the cutting blade for protecting the same, means connecting said blades to said handle, and a furcation on one of said blades forming a V-shaped notch having sharp edges adapted to bite into both sides of the can bead to prevent slippage during the cutting operation, said edges also serving as a fulcrum.

5. In a can opener, including a cutting blade and a guiding blade in spaced relationship, a furcation on one of said blades extending diagonally through the plane thereof and across the space between said blades, said one of said blades and said furcation cooperating to grip the can bead with scissor like action and form a fulcrum.

In testimony whereof I have hereunto subscribed my name at Chicago, Cook County, Illinois.

JOSEPH T. WISHER.